July 15, 1958  B. E. BEMENT  2,843,758
ENGINE STARTING CIRCUIT
Filed Sept. 12, 1955
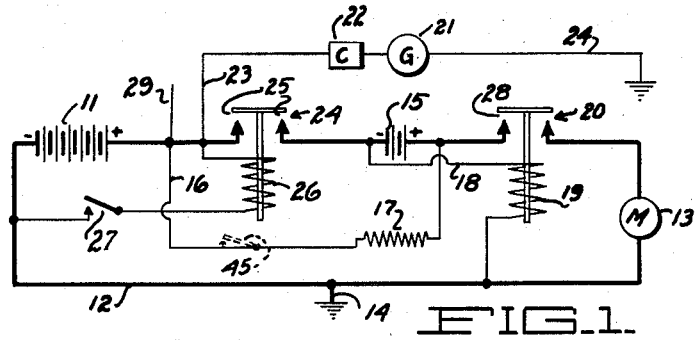
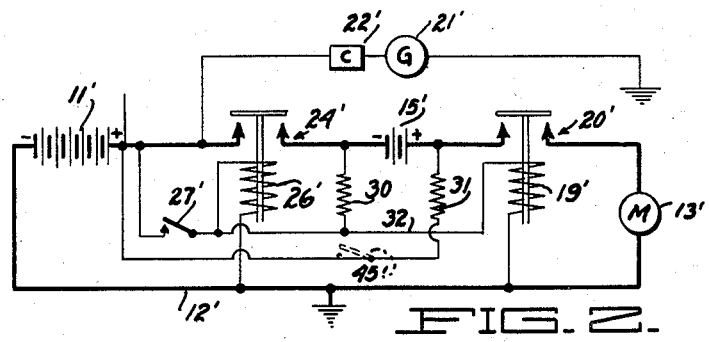
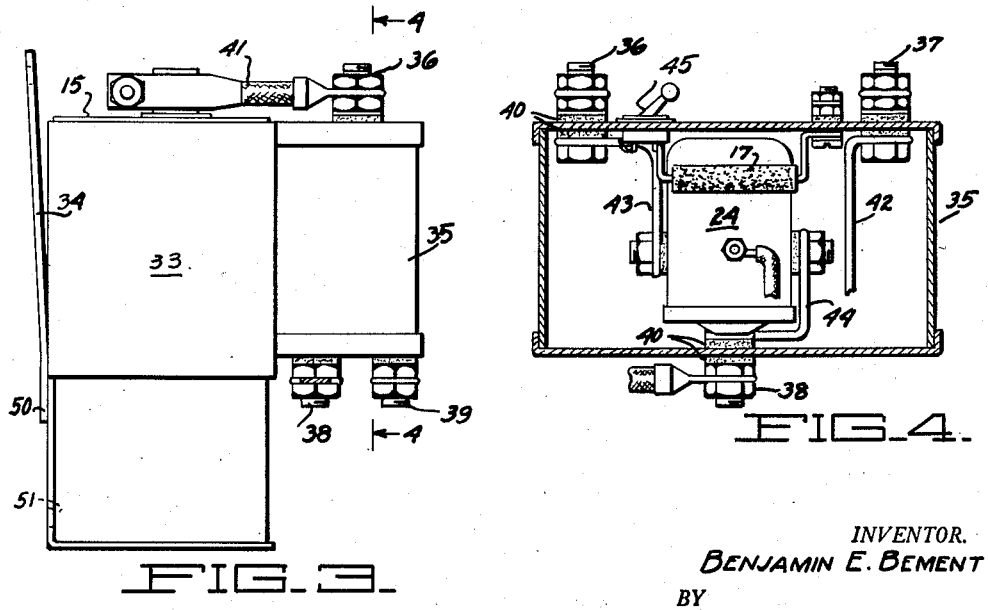
INVENTOR.
BENJAMIN E. BEMENT
BY
Fred N. Schwend
ATTORNEY United States Patent Office 2,843,758
Patented July 15, 1958

2,843,758

ENGINE STARTING CIRCUIT

Benjamin E. Bement, Rivera, Calif.

Application September 12, 1955, Serial No. 533,644

6 Claims. (Cl. 290—36)

This invention relates to engine starting circuits for internal combustion engines and the like which require electric starting motors.

Heretofore, difficulty has often been encountered in starting engines of the above type, especially in cold weather, and particularly, in starting relatively large engines such as are found on trucks, tractors, etc. One of the reasons for this difficulty is that the starting motor places a relatively large load on the battery at just the instant when full voltage is desired in the ignition circuit in order to obtain proper firing of the fuel.

It therefore becomes a principal object of the present invention to reduce the drop in voltage for the ignition system of an ignition fired internal combustion engine due to operation of the starting motor.

Another object is to provide additional voltage during an engine starting operation.

Another object is to enable proper starting of an engine even though its battery or batteries are in relatively poor condition.

Another object is to provide a circuit for an auxiliary battery in an engine starting circuit wherein the main battery maintains the auxiliary battery in fully charged condition.

The manner in which the above and other objects of the invention are accomplished will be readily understood on reference to the following specification when read in conjunction with the accompanying drawing, wherein:

Fig. 1 is a schematic wiring diagram of a starting motor circuit, illustrating a preferred form of my invention.

Fig. 2 is a schematic wiring diagram of a modified form of my invention.

Fig. 3 is a side view of a housing unit for housing part of the starting circuit.

Fig. 4 is a transverse sectional view of part of the housing unit and is taken along the line 4—4 of Fig. 3.

Referring to Fig. 1 in particular, the circuit shown therein comprises the usual main battery 11 which for the purpose of the present illustration is considered a 6 volt battery. The negative pole of the latter is connected through a ground line 12 to one side of the starter motor 13 and is also grounded at 14 to the engine mount.

The battery 11 is connected in parallel to a smaller 2 volt auxiliary battery 15, and for this purpose the positive pole of the battery 11 is connected through a line 16 and resistor 17 to the positive pole of the auxiliary battery 15. The negative pole of the battery 15 is connected to the ground line 12 through a line 18 and the actuating coil 19 of a normally open starting relay 20.

A charging circuit is provided for the batteries and comprises the usual engine driven generator 21 and a cut out switch 22 which, according to usual practice, is automatically opened when the engine is not operating. The output side of the generator and cutout switch is connected through line 23 to the positive pole of the main battery 11 while the input side of the generator is connected to a ground line 24, thus connecting the generator in parallel with both batteries.

The above circuit connections enable the generator to charge both batteries during operation of the engine and the value of resistor 17 is so chosen as to balance the load presented to the charging circuit by both batteries notwithstanding the fact that the auxiliary battery is a smaller size.

It will be noted that since the two batteries are in continuous parallel connection, the larger 6 volt battery will be effective to continuously maintain the two volt battery 15 in proper charge during periods in which the engine is not operating. The amount of current used will be relatively small and will decrease as the auxiliary battery becomes charged, but under no condition, other than when starting, will this flow of current which passes through the coil 19 of relay 20, be sufficient to actuate the relay 20.

Means are provided to connect both batteries 11 and 15 in series during operation of the starting motor 13 so as to apply a total of 8 volts to the latter. For this purpose, a second normally open starting relay 24 is provided, having its switch contacts 25 located in series relation with the positive pole of the main battery 11 and the negative pole of the auxiliary battery 15.

The actuating coil 26 of relay 24 is connected in series with a starting switch 27 and the circuit is connected across the main battery 11. Thus, when the switch 27 is closed to energize the starter motor, the relay 24 will connect the batteries in series and the increased current through the actuating coil 19, due to this series connection will close the relay 20. Although the batteries remain in parallel connection during a starting operation, this will have little effect on the series flow of current through the batteries, particularly due to the resistor 17 placed in the circuit. The relay switch contacts 28 now close connecting the positive pole of the auxiliary battery 15 to the input side of the starter motor 13.

The ignition circuit, partly indicated at 29, is connected to the positive pole of the main battery 11 so that even though the voltage applied by both batteries may drop due to possible excess current consumption by the starter motor, the drop in voltage applied to the ignition system will be proportionately less.

Fig. 2 illustrates a modified form of the invention in which components similar to those shown in Fig. 1 are identified by primed reference numerals. In this case, however, the actuating coils 19' and 26' of the relays 20' and 24', respectively, are connected in parallel. The lower ends of the actuating coils of these relays are connected to the ground line 12' while the upper ends are connected together by a line 32 and placed in circuit with a starter switch 28' which, in turn, is connected to the positive pole of the main battery 11'. Two resistors 30 and 31 are here provided, having a combined resistance equal to that of the resistor 17 in Fig. 1. One resistor 30 is connected between the negative pole of the auxiliary 2 volt battery 15' and the line 32 connecting the upper ends of the coils 19' and 26'. The other resistor 31 is connected between the positive pole of the battery 15' and the positive pole of the main 6 volt battery 11'.

The resistors 30 and 31 are thus located in series with the battery 15' and the actuating coils 19' and 26' across the main battery 11'. When the engine is not operating, battery 11' is charging the auxiliary battery 15' or when the generator is charging, some current will pass through coils 19' and 26' but this will not be sufficient under these circumstances to close relays 20' and 24'.

However, when the starting switch 27' is closed, current will be simultaneously applied to the coils of both relays 20' and 24' to simultaneously close both relays and thus set up a series circuit through both batteries 11' and 15' to the starter motor 13'. Thus, a total of 8 volts will be applied to the motor 13'. Here also, the parallel connection between the batteries will not be disturbed during starting.

Figs. 3 and 4 illustrate a physical embodiment of part of the circuit shown in Fig. 1. The two-volt battery 15 is mounted in a housing box 33 having suitable lugs 34 thereon for attachment to the firewall or other structural part of the engine framework.

These lugs are secured to the housing 33 at their lower ends as by welding and have holes through the upper ends thereof, through which clamp bolts may be passed. The lugs 34 are of a length such that they may be readily bent to conform to the supporting surface and yet retain the housing and battery in an upright position. Additional holes, as at 51, enable the lower end of the housing to be attached by bolts to the supporting surface.

The housing 33 has suitably secured thereto a second housing box 35. A pair of terminal bolts 36 and 37 are attached to the top of the box 35 and a second pair of bolts 38 and 39 are attached to the bottom of the box. These bolts are insulated from the walls of the box by insulators 40. The upper bolts 36 and 37 are connected through electrical cables, like cable 41, to the positive and negative poles of the battery 15 while the lower bolts are connected in a manner not shown to one of the switch contacts of relay 20 and to the positive side of the main battery, respectively. The bolts 37 and 39 are connected together, within the box 35, by a heavy duty conductor strip partly shown at 42. The bolt 36 is connected by a heavy duty conductor strip 43 to one of the contacts of the relay 24 while the bolt 38 is connected by a similar strip 44 to the other contact of this relay.

Fig. 4 illustrates a modification of the circuit shown in Fig. 1 wherein a selectively settable switch 45 is mounted on the box 35 and is connected in circuit with one end of the resistor 17 and the bolt 36. The switch, also indicated by the dotted lines 45 in Fig. 1, is normally closed to enable the main battery to charge the auxiliary battery whenever the latter requires charging. Although a small current leakage will exist even if the auxiliary battery is fully charged, this is found to be negligible even if the engine is not operated over periods of a few days or less. However, if the engine is to be left idle for an excessively long period of time, the switch 45 may be opened to disconnect the batteries from their parallel connection.

Although I have described my invention in detail and have therefore used certain terms and languages herein, it is to be understood that the present disclosure is illustrative rather than restrictive and that changes and modifications may be made without departing from the spirit or scope of the invention as set forth in the claims appended hereto. For example, the invention has been found to work equally well with main batteries of 12 volts or more. Also, other means or circuit connections may be provided for closing the starting relay 24.

Having thus described the invention what I desire to secure by United States Letters Patent is:

1. A starting circuit for an engine having a starting motor and a main battery; comprising an auxiliary battery; a circuit connecting said main battery in parallel relation to said auxiliary battery; a first normally open switch connected in series relation between said batteries; a second normally open switch connected in series relation between one of said batteries and said starting motor; means for closing said first switch; and means responsive to closing of said first switch for closing said second switch.

2. A starting circuit as claimed in claim 1 comprising selectively settable means for opening said circuit.

3. A starting circuit for an engine having a starting motor and a main battery; comprising an auxiliary battery; a circuit connecting said main battery in parallel relation with said auxiliary battery; a normally open switch having its contacts connected in series relation between said batteries; a normally open relay having contacts connected in series relation between one of said batteries and said starting motor; said relay having an operating coil located in said circuit; and means for closing said switch; said operating coil being effective to close said relay only when said batteries are connected in series.

4. A starter circuit for an engine having a starting motor and a main battery; comprising an auxiliary battery having less potential than said main battery, a generating circuit connected on one side to like poles of said batteries and on the opposite side to the opposite like poles of said batteries; resistance means connected in series with said auxiliary battery; said resistance means being effective to substantially balance the load presented to said generating circuit by both said batteries; a first normally open relay having contacts connected in series relation between said batteries; a second normally open relay having contacts connected in series relation between one of said batteries and said starting motor; said second relay having an actuating coil located in series with said auxiliary battery; and means for closing said first relay; said actuating coil being effective to close said second relay only when said batteries are connected in series.

5. A starting circuit for an engine having a starting motor and a main battery; comprising an auxiliary battery having less potential than said main battery, a parallel circuit connecting said main battery in parallel relation to said auxiliary battery; a generating circuit connected on one side to like poles of said batteries and the opposite side to opposite like poles of said batteries; resistance means connected in series with said auxiliary battery in said parallel circuit; said resistance means being effective to substantially balance the load presented to said generating circuit by both said batteries; a first normally open relay connected in series relation between said batteries; a second normally open relay connected in series relation between one of said batteries and said starting motor; means for closing said first relay; and means responsive to closing of said first relay for closing said second relay, said last mentioned means being effective to close said second relay only when said batteries are connected in series.

6. A starter circuit as claimed in claim 5 comprising selectively settable means for opening said parallel circuit.

References Cited in the file of this patent

UNITED STATES PATENTS

| | | |
|---|---|---|
| 1,067,631 | Woodbridge | July 15, 1913 |
| 1,192,400 | Edison | July 25, 1916 |
| 1,773,920 | Mayforth | Aug. 26, 1930 |
| 1,828,620 | Rall | Oct. 30, 1931 |
| 2,066,010 | Lindem | Dec. 29, 1936 |
| 2,096,378 | Mitchell | Oct. 19, 1937 |
| 2,248,244 | Leece | July 18, 1941 |
| 2,344,568 | Snyder | Mar. 21, 1944 |
| 2,521,969 | Dugan | Sept. 12, 1950 |
| 2,692,953 | Markett | Oct. 26, 1954 |
| 2,725,488 | Hueffed et al. | Nov. 29, 1955 |
| 2,729,750 | Draper et al. | Jan. 3, 1956 |
| 2,761,978 | Piumi | Sept. 4, 1956 |